(12) United States Patent
Innes et al.

(10) Patent No.: US 12,304,100 B1
(45) Date of Patent: May 20, 2025

(54) SHEAR AND GRIP DEVICE, SYSTEM AND METHOD

(71) Applicant: AGI Engineering, Inc., Linden, CA (US)

(72) Inventors: Alex G. Innes, Lodi, CA (US); Christopher J. Wheeler, Stockton, CA (US)

(73) Assignee: AGI Engineering, Inc., Linden, CA (US)

( * ) Notice: Subject to any disclaimer, the term of this patent is extended or adjusted under 35 U.S.C. 154(b) by 370 days.

(21) Appl. No.: 17/964,372

(22) Filed: Oct. 12, 2022

Related U.S. Application Data

(60) Provisional application No. 63/254,571, filed on Oct. 12, 2021.

(51) Int. Cl.
  *B26D 1/40* (2006.01)
  *B25J 11/00* (2006.01)

(52) U.S. Cl.
  CPC ............ *B26D 1/40* (2013.01); *B25J 11/0055* (2013.01)

(58) Field of Classification Search
  CPC ....... B26D 1/40; B25J 11/0055; B23D 29/002
  USPC ........................................................... 83/13
  See application file for complete search history.

(56) References Cited

U.S. PATENT DOCUMENTS

| 4,771,540 | A | * | 9/1988 | LaBounty | B23D 17/00 |
| | | | | | 144/345 |
| 10,280,063 | B2 | | 5/2019 | Innes et al. | |
| 10,406,571 | B2 | | 9/2019 | Innes et al. | |
| 10,786,905 | B1 | | 9/2020 | Innes | |
| 10,864,640 | B1 | | 12/2020 | Innes et al. | |
| 11,031,149 | B1 | | 6/2021 | Innes | |
| 11,267,024 | B2 | | 3/2022 | Innes | |
| 11,311,920 | B2 | | 4/2022 | Innes | |
| 11,413,666 | B1 | | 8/2022 | Innes | |

FOREIGN PATENT DOCUMENTS

| CN | 106677234 | B | * | 4/2019 | ................ E02F 3/28 |
| CN | 112059272 | A | * | 12/2020 | |
| KR | 101893851 | B1 | * | 8/2018 | |
| WO | WO-2020137158 | A1 | * | 7/2020 | ............. B23D 29/02 |

OTHER PUBLICATIONS

Translation CN-112059272-A (Year: 2024).*
Translation, KR-101893851-B1 (Year: 2024).*

* cited by examiner

*Primary Examiner* — Nhat Chieu Q Do
(74) *Attorney, Agent, or Firm* — Brian S. Steinberger; Hilary F. Steinberger; Steinberger IP Law

(57) ABSTRACT

Combination gripping and shearing effector device, systems and methods for both shearing and gripping in tandem with a remotely actuated effector tool used in robotic and remote processing of materials, where the gripping and shearing operate in tandem with one another. In a preferred embodiment, the device can include a pair of gripping jaws, with a pair of separately movable, and integrated shearing jaws within the gripping jaws. Hydraulic actuators can control the gripping jaws to grip material, followed by the shearing jaws shearing the material. The effector devices can be remotely controlled, hydraulically opening and closing the gripper and shear jaws with a single hydraulic control circuit.

9 Claims, 8 Drawing Sheets

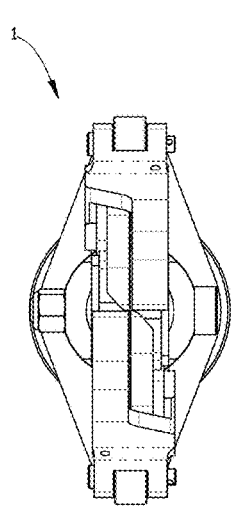
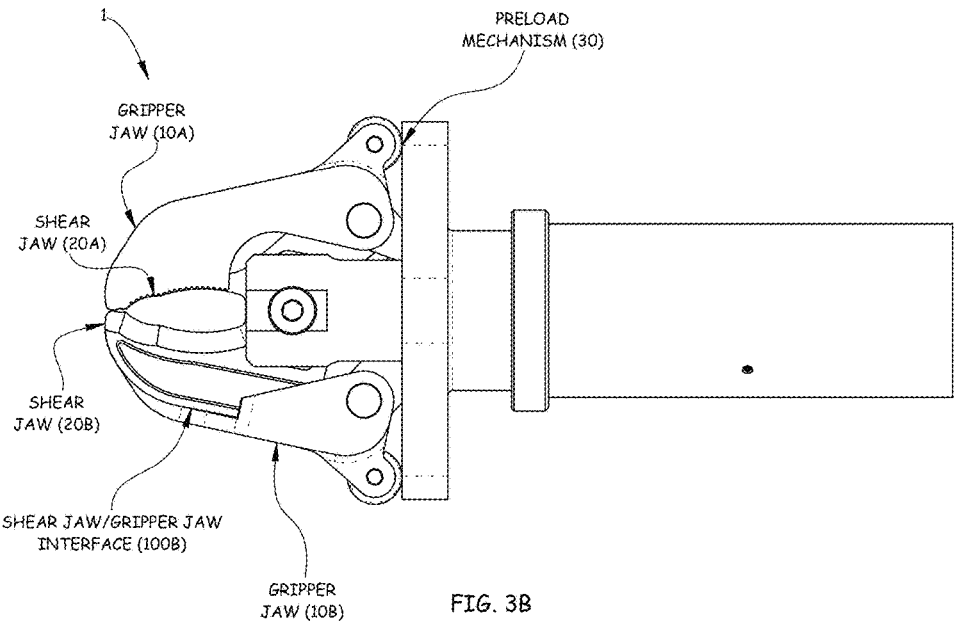
FIG. 3A  FIG. 3B
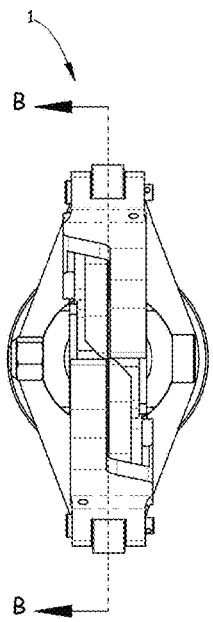
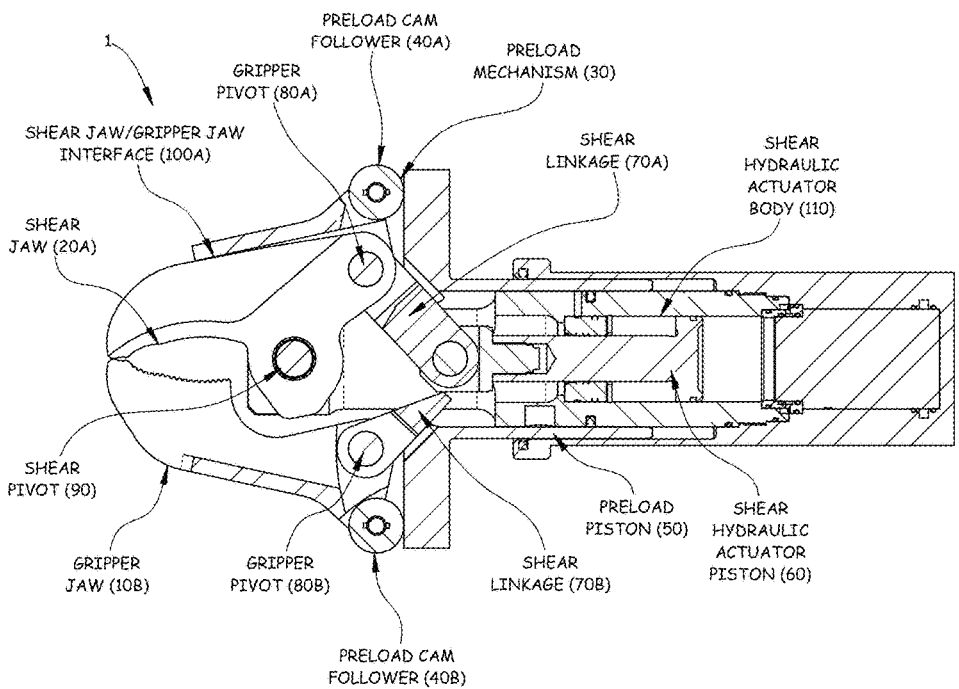
FIG. 4A  FIG. 4B

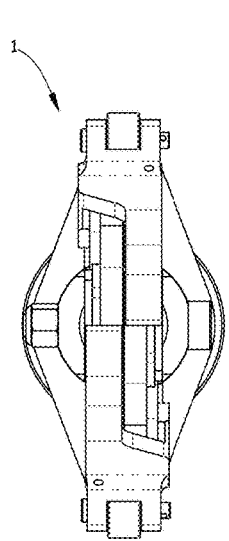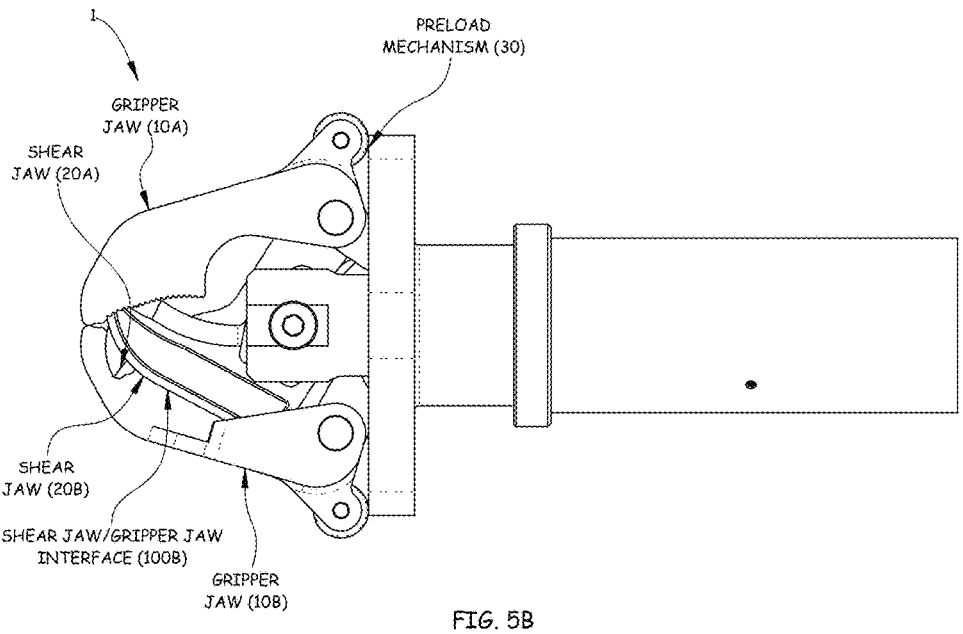
FIG. 5A    FIG. 5B
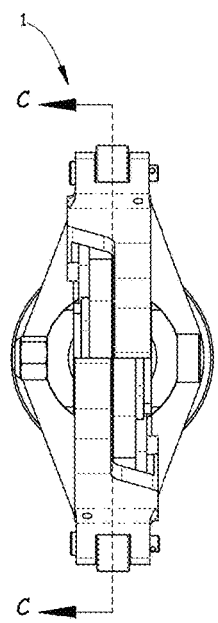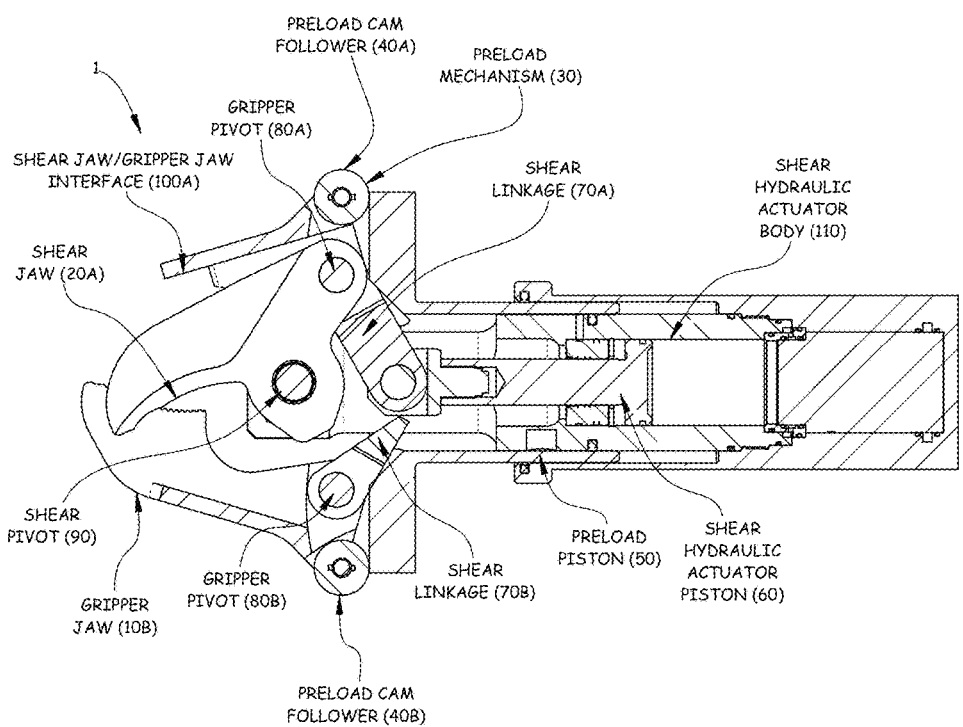
FIG. 6A    FIG. 6B

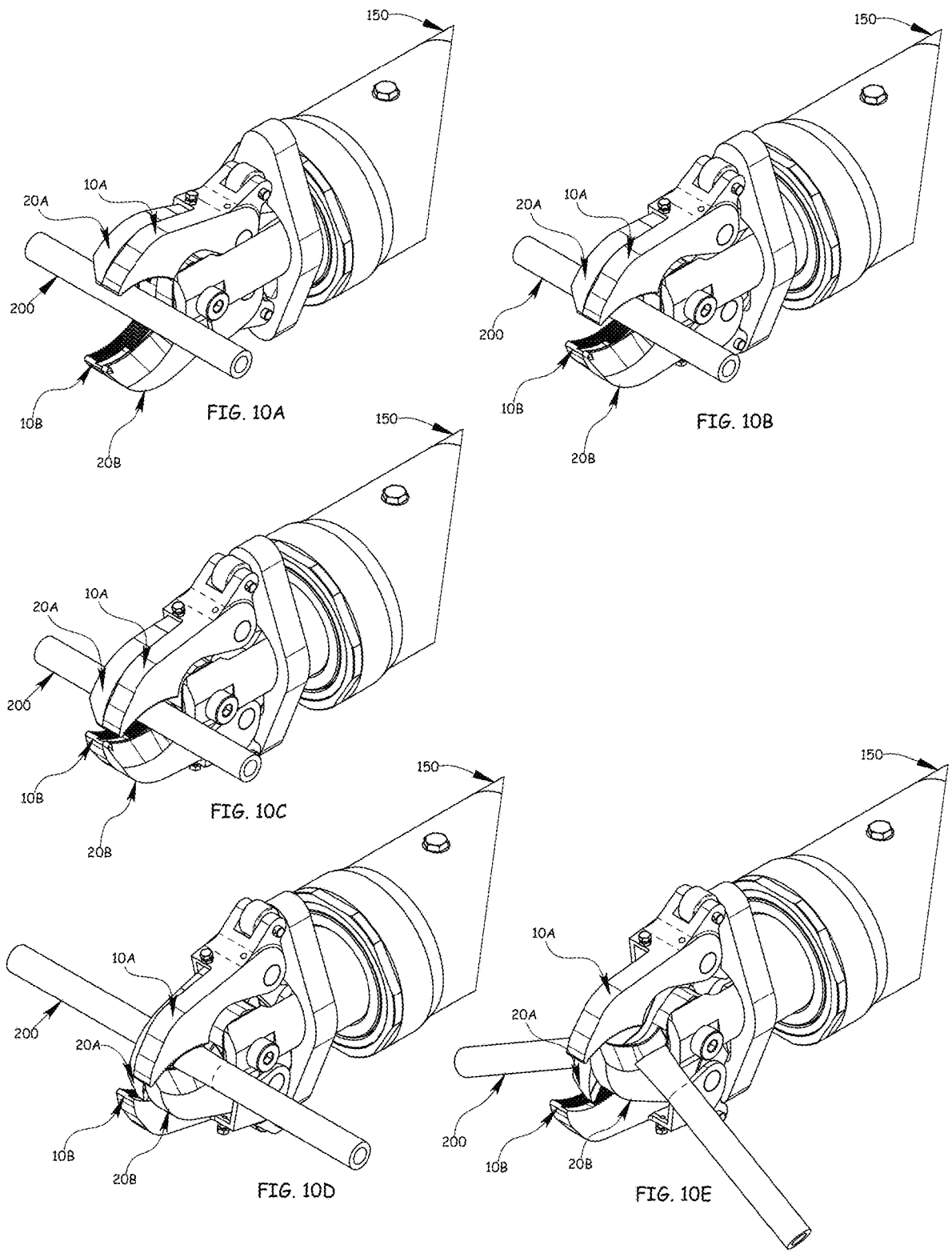

SHEAR AND GRIP DEVICE, SYSTEM AND METHOD

CROSS REFERENCE TO RELATED APPLICATIONS

This application claims the benefit of priority to U.S. Provisional Application Ser. No. 63/254,571 filed Oct. 12, 2021, the entire disclosure which is incorporated herein by specific reference thereto.

FIELD OF INVENTION

This invention relates to remotely actuated effectors, and in particular to shear and grip devices, systems and methods for both shearing and gripping in tandem with a remotely actuated effector tool used in robotic and remote processing or manipulating of materials, debris or components.

BACKGROUND AND PRIOR ART

In robotic or remote processing of materials in an unknown or challenging environment, such as cleanup of debris or materials in radioactive, toxic or hazardous situations, it is often desirable to be able to pick up said debris, as well as to cut or resize that debris into smaller pieces. Picking up debris or pieces of debris is often done with a gripping device consisting of two jaws that can open and close on the debris, trapping it between the jaws. Cutting or resizing debris is also often done with a shearing device with two similar jaws, except with sharpened edges, to shear material as the two jaws pass each other.

Tool changers that allow one robotic arm to implement more than one end effector and switch between them are available, allowing for gripping and shearing ability on the same robot. Often, however, it would be beneficial to hold the material with a pair of gripper jaws, while shearing with a pair of shear jaws, requiring mounting and controlling two implements. Existing implements that can operate shearing and gripping functions in tandem are not available.

Thus, the need exists for solutions to the above problems with the prior art.

SUMMARY OF THE INVENTION

A primary objective of the present invention is to provide shear and grip devices, systems and methods for both shearing and gripping in tandem with a remotely actuated effector tool used in robotic and remote processing or manipulating of materials, debris or components A secondary objective of the present invention is to provide shear and grip devices, systems and methods for both shearing and gripping in tandem with a remotely actuated effector tool that shares mechanical operating components for both using the tool for shearing and gripping actions A further objective of the present invention is to provide shear and grip devices, systems and methods for both shearing and gripping in tandem with a remotely actuated effector tool that operates together via a single control mechanism, source or signal.

This device places a pair of gripper jaws around a pair of shear jaws so that material can be held by the gripper function, while actuating the shearing function to cut the material. The shear and gripper jaws work together with a single control mechanism to open and close in tandem.

A piece of material can be gripped and manipulated using the combination of the two pairs of jaws. When material needs to be cut the gripper function can be used to hold the material in position and the shear jaws can be actuated fully through their range of motion to effect shearing of the material.

The shear jaws are directly controlled via hydraulic, pneumatic, electric, or other means of opening and closing. The gripper jaws are positioned in such a way that they can open independently of the shear jaws and close to a position even with the primary (shearing) faces of the shear jaws. A preload mechanism is used to push the gripper jaws against the shear jaws. This preload can be created with air or mechanical springs, hydraulic or pneumatic pressure, or other methods.

This jaw and preload arrangement allows the gripper jaws to open as the shear jaws open and close when the shear jaws close, requiring only a single point of control (be it electric, hydraulic, pneumatic, etc.). When the gripper jaws contact a piece of material they stop closing and the preload is used to hold the grippers closed on the subject material, independent of whether the shear jaws continue to close. If the shear jaws continue through the closing and shearing motion the preload on the gripper jaws holds position based on the preload and move out of the way as required by the shear jaw loading. Opening the shear jaws pushes the gripper jaws open, releasing the hold on the material.

An embodiment of a shear and grip device, can include a pair of gripping jaws attached to an actuator, and a pair of shearing jaws within the pair of gripping jaws attached to the actuator, wherein the actuator operates the gripper jaws and shearing jaws in tandem.

The actuator can be selected from at least one of: hydraulic, pneumatic, electric, magnetic, mechanical screw, spring, and any combination thereof, for opening and closing the pair of gripping jaws and the pair of shearing jaws.

The actuator can include a preload piston for operating the pair of gripping jaws; and a shear piston for operator the pair of shear jaws.

The preload piston can be oriented concentric to the shear piston.

The preload piston can include a hydraulic preload piston, and the shear piston can include a hydraulic piston.

The preload piston and the shear piston can be selected from at least one of: hydraulic, pneumatic, electric, magnetic, mechanical screw, spring, and any combination thereof, for opening and closing the pair of gripping jaws and the pair of shearing jaws.

The shear and grip device can include a remote controller for operating the shear and grip device.

The shear and grip device can include a mount for mounting the shear and grip device to a remotely controlled robot.

The shear and grip device can include a mount for mounting the shear and grip device to anyone of a backhoe, a skid-steer, and demolition equipment.

A shear and grip device, and include a pair of pivoting gripping jaws attached to a grip actuator, and a pair of pivoting shearing jaws adjacent to the pair of pivoting gripping jaws attached to a shear actuator, wherein the grip actuator and the shear actuator causes the gripping jaws and shearing jaws to move together during a gripping phase, and the shear actuator causes the shearing jaws to continue to move together during a shear phase.

A method for gripping and shearing an object, can include the steps of providing a pair of pivoting gripping jaws attached to a grip actuator; providing a pair of pivoting shearing jaws adjacent to the pair of pivoting gripping jaws attached to a shear actuator; mounting the grip actuator and the shearing actuator to an arm assembly; actuating the gripping jaws and the shearing jaws to move together during a gripping phase; and actuating the shearing jaws to continue to move together during a shear phase.

The method can further comprise the step of: providing the grip actuator with a preload piston for operating the pair of gripping jaws; and providing the shear actuator with a shear piston for operator the pair of shear jaws.

The preload piston can be oriented concentric to the shear piston.

The preload piston can include a hydraulic preload piston, and the shear piston can include a hydraulic piston.

The method can further comprise the steps of: mounting the arm to a support; and remotely controlling the grip actuator and the shear actuator.

The method can further comprise the step of gripping and shearing through pipes and conduits.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 3A is a front view of the preferred embodiment of the shear and grip device of FIG. 1A shown with shear and gripper jaws partially closed to a gripping Position.

FIG. 3B is a side view of the preferred embodiment of the shear and grip device shown in FIG. 3A with shear and gripper jaws partially closed to a gripping position.

FIG. 4A is a front view of the referred embodiment of FIG. 3A with shear and grip device with shear and gripper jaws Partially Closed to a Gripping Position.

FIG. 4B is a cross-sectional view of FIG. 4A along arrows B-B of the preferred embodiment of the shear and grip device shown with shear and gripper jaws partially closed to a gripping position.

FIG. 5A is a front view of the preferred embodiment of the shear and grip Device of FIG. 1A shown with shear and gripper jaws fully closed to the fully sheared position.

FIG. 5B is a side view of the preferred embodiment of the shear and grip device of FIG. 5A shown with shear and gripper jaws fully closed to the fully sheared position.

FIG. 6A is a front view of the preferred embodiment of shear and grip device of FIG. 5A shown with shear and gripper jaws fully closed to the fully sheared position.

FIG. 6B is a cross-sectional view along arrows C-C of FIG. 6A with shear and gripper jaws fully closed to the fully sheared position.

FIG. 9A is a perspective view of the arm assembly with shear and gripper jaws of FIG. 8C with shear jaws in a partial shearing position.

FIG. 9B is a perspective view of the arm assembly with shear and gripper jaws of FIG. 9A with shear jaws in a fully shearing position.

FIG. 10A is another perspective view of FIG. 8A with shear and gripper jaws fully open about a pipe/conduit.

FIG. 10B is another perspective view of FIG. 8B with shear and gripper jaws slightly closed about a pipe/conduit.

FIG. 10C is another perspective view of FIG. 8C with shear and gripper jaws closed into a full grip about a pipe/conduit.

FIG. 10D is another perspective view of FIG. 9A with shear and gripper jaws, and shear jaws in a partial shearing position into the pipe/conduit.

FIG. 10E is another perspective view of FIG. 9B with shear and gripper jaws, and shear jaws in fully shearing position through a pipe/conduit.

DESCRIPTION OF THE PREFERRED EMBODIMENTS

Figures 1A, 1B:
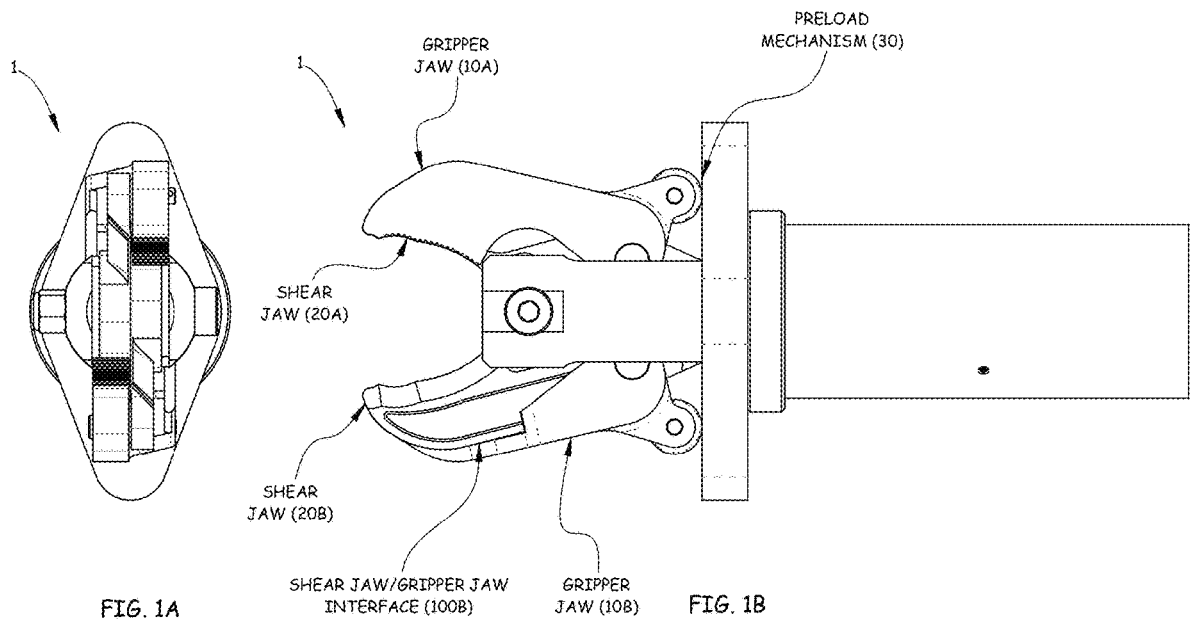
FIG. 1A is a front view of a preferred embodiment of a shear and grip device shown with shear and gripper jaws open.
FIG. 1B is a side View of the preferred embodiment of the shear and grip device of FIG. 1A shown with shear and gripper jaws open

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of components will now be described:
1 shear and grip device
10A gripper jaw
10B gripper jaw
20A shear jaw
20B shear jaw
30 preload mechanism
40A preload cam follower
40B preload cam follower
50 preload piston
60 shear hydraulic actuator piston
70A shear linkage
70B shear linkage
80A gripper pivot
80B gripper pivot
90 shear pivot
100A shear jaw/gripper jaw interface
100B shear jaw/gripper jaw interface
110 shear hydraulic actuator body
150 arm assembly FIG. 1A is a front view of a preferred embodiment of a shear and grip device 1 shown with gripper jaws 10A, 10B and shear jaws 20A, 20B open. FIG. 1B is a side View of the preferred embodiment of the shear and grip device 1 of FIG. 1A shown with gripper jaws 10A, 10B and shear jaws 20A, 20B open.

Figures 2A, 2B:
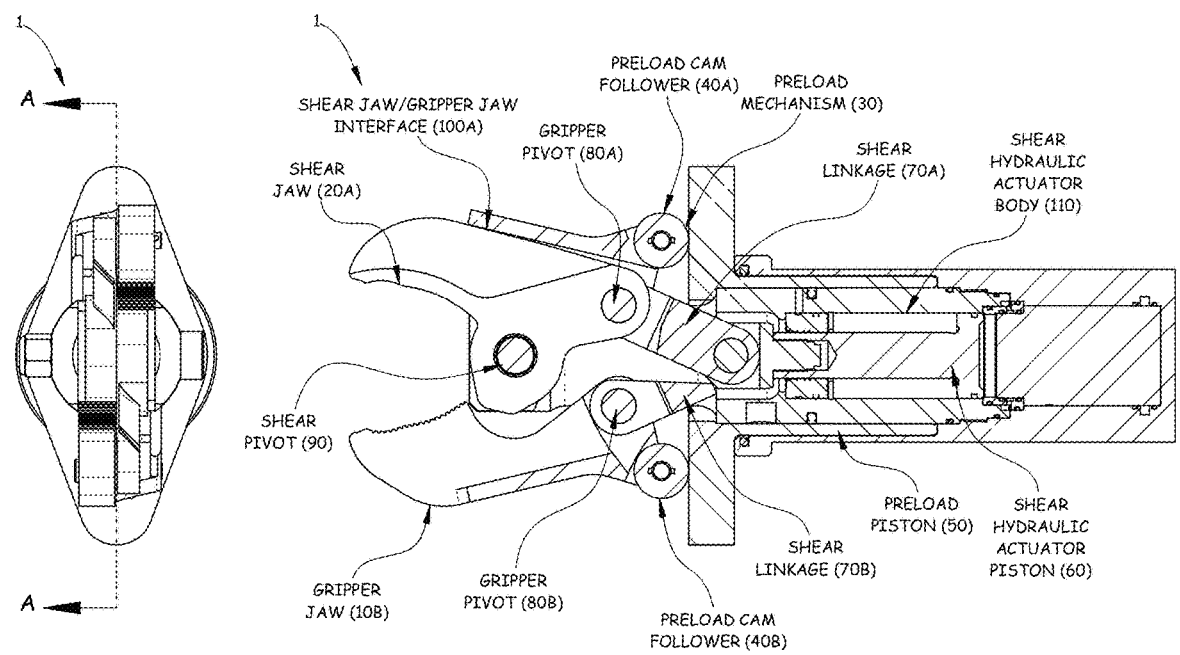
FIG. 2A is a front view of the preferred embodiment of the shear and grip device of FIG. 1A shown with shear and gripper jaws open
FIG. 2B is a cross-sectional view of the preferred embodiment of the shear and grip device of FIG. 2A along arrows A-A shown with shear and gripper jaws open

FIG. 2A is a front view of the preferred embodiment of the shear and grip device 1 of FIG. 1A shown with gripper jaws 10A, 10B and shear jaws 20A, 20B open. FIG. 2B is a cross-sectional view of the preferred embodiment of the shear and grip device 1 of FIG. 2A along arrows A-A shown with gripper jaws 10A, 10B and shear jaws 20A, 20B open.

FIG. 3A is a front view of the preferred embodiment of the shear and grip device 1 of FIG. 1A shown with shear and gripper jaws partially closed to a gripping Position. FIG. 3B is a side view of the preferred embodiment of the shear and grip device shown 1 in FIG. 3A with shear and gripper jaws partially closed to a gripping position.

FIG. 4A is a front view of the referred embodiment of FIG. 3A with shear and grip device 1 with shear and gripper jaws partially Closed to a gripping Position. FIG. 4B is a cross-sectional view of the preferred embodiment of the shear and grip device 1 of FIG. 4A along arrows B-B of the preferred embodiment of the shear and grip device 1 shown with shear and gripper jaws partially closed to a gripping position.

FIG. 5A is a front view of the preferred embodiment of the shear and grip device 1 of FIG. 1A shown with shear and gripper jaws fully closed to the fully sheared position. FIG. 5B is a side view of the preferred embodiment of the shear and grip device 1 of FIG. 5A shown with shear and gripper jaws fully closed to the fully sheared position.

FIG. 6A is a front view of the preferred embodiment of shear and grip device 1 of FIG. 5A shown with shear and gripper jaws fully closed to the fully sheared position. FIG. 6B is a cross-sectional view of the preferred embodiment of the shear and grip device 1 of FIG. 6A along arrows C-C of with shear and gripper jaws fully closed to the fully sheared position.

Figure 7:
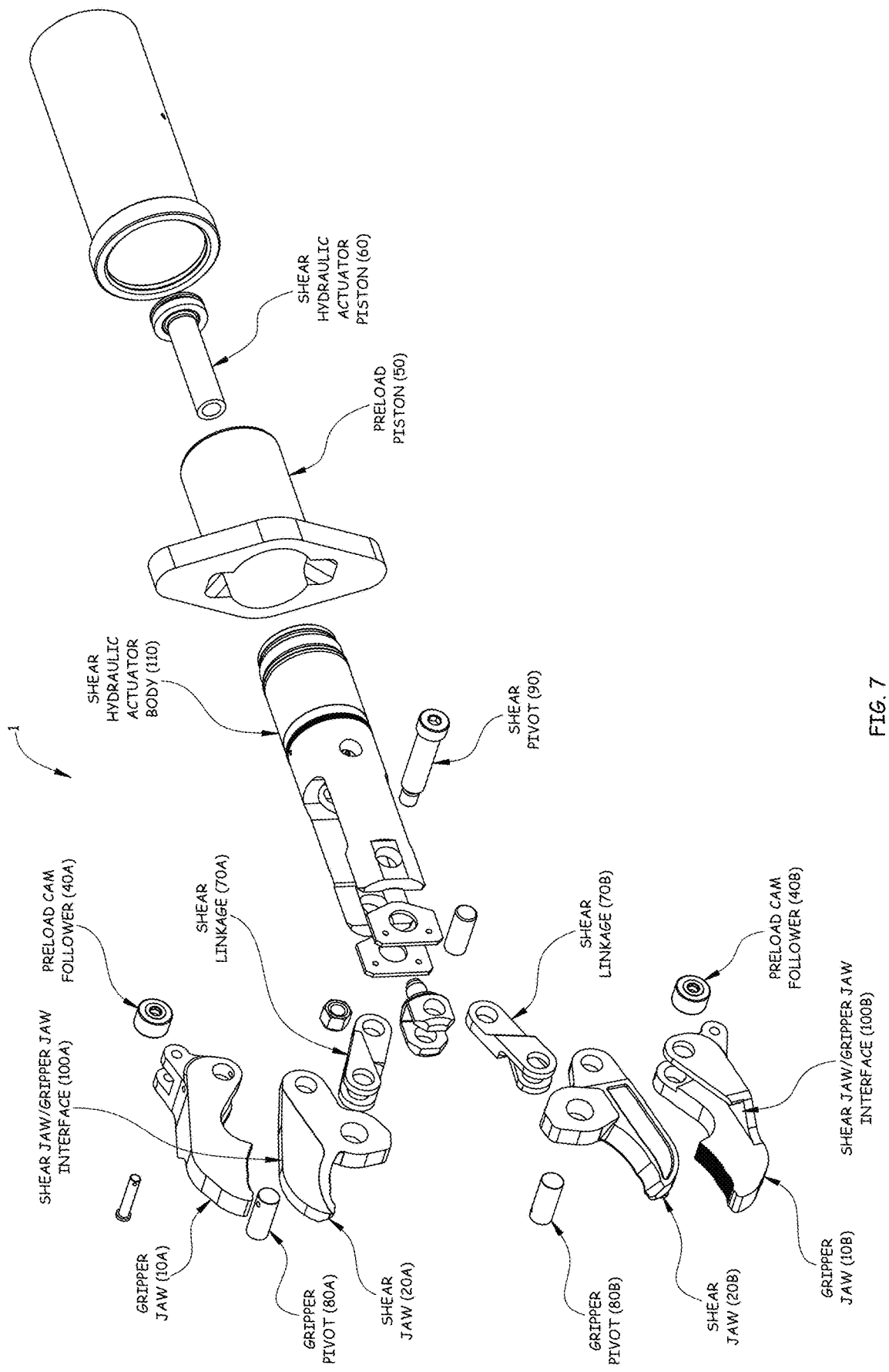
FIG. 7 is an exploded view of the preferred embodiment of the shear and grip device shown in FIGS. 1A-6B.

FIG. 7 is an exploded view of the preferred embodiment of the shear and grip device shown in FIGS. 1A-6B.

Referring to FIGS. 1-7, the preferred embodiment can use a hydraulic operated Shear Piston 60 to operate the shear jaws 20A, 20B via two shear linkages 70A, 70B. The shear jaws 20A, 20B rotate around the shear pivot 90 to open and close via movement from the shear linkages 70A, 70B as the shear piston 60 actuates.

The gripper jaws 10A & 10B pivot around the gripper pivots 80A, 80B on the shear jaws so that the position of the two is related based on the preload mechanism 30, the shear jaw position and the size of anything held within the jaws 10A, 10B. The preload mechanism 30 pushes the gripper jaws 10A, 10B closed and maintains them pressed up against anything impeding that motion. If a piece of material or debris is held in the gripper jaws they will be maintained with pressure against the material or debris. If nothing is held within the gripper jaws, they will close against the shear jaws 20A, 20B at the shear jaw/gripper jaw interfaces 100A, 100B.

When the shear jaws 20A, 20B open, they can push the gripper jaws 10A, 10B open. When the shear jaws 20A, 20B close the gripper jaws 10A, 10B are close around them by the preload mechanism 30.

Shear jaws 20A, 20B can be directly controlled via hydraulic, pneumatic, electric, or other means of opening and closing.

In this Embodiment the preload mechanism 30 consists of a preload piston 50 that is pressurized with constant or nearly constant pressure.

A flat face on the preload piston 50 applies a continuous load against the preload cam followers 40A, 40B, forcing the gripper jaws 10A, 10B closed.

In this Embodiment the preload piston 50 can be a hydraulic piston oriented concentric to the shear piston 60.

Alternatively, the preload piston 50 can be one or more independent pistons, a mechanical spring, air spring, pneumatic piston, or other preload device.

As the shear jaws 20A, 20B open and close the gripper jaws 10A, 10B follow until the point something is gripped between the jaws. At that point, if the shear jaws 20A, 20B continue to close the gripper jaws 10A, 10B will lose contact at the shear jaw/gripper jaw Interface 100A and the shear jaws 20A, 20B will shear the material independently of the gripping action of the gripper jaws 10A, 10B.

Figure 8A:
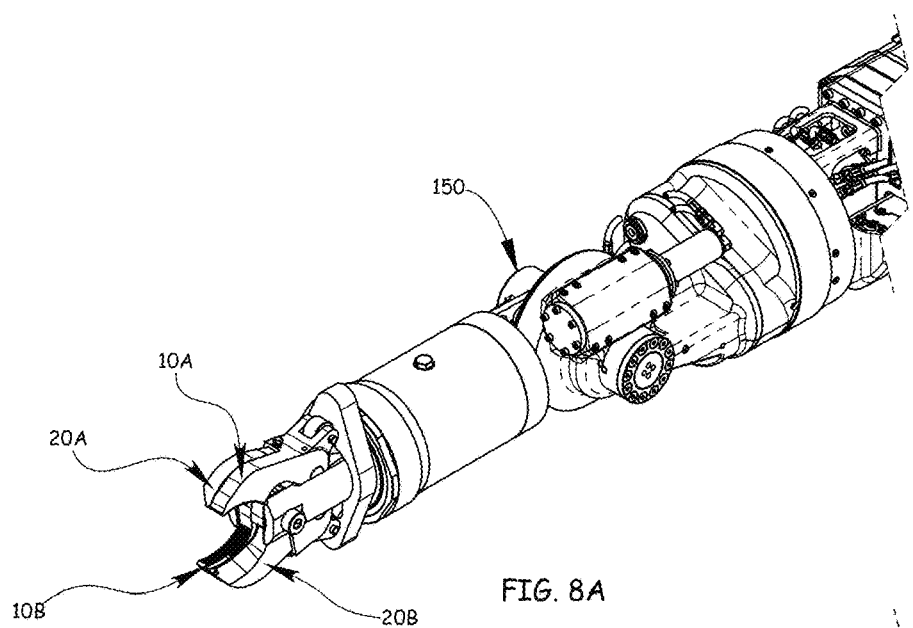
FIG. 8A is a perspective partial view of the arm assembly with shear and gripper jaws fully open.
Figure 8B:
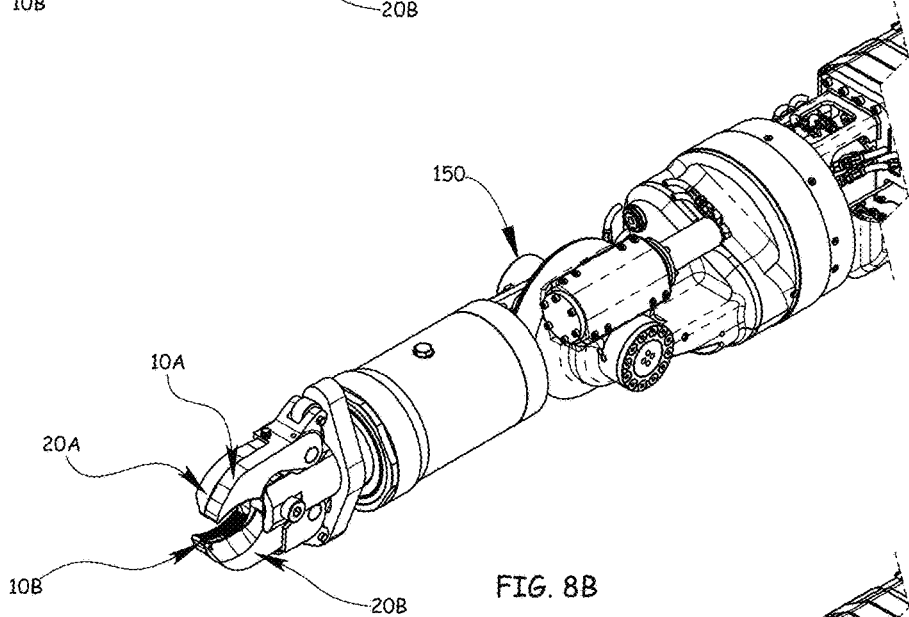
FIG. 8B is a perspective of the arm assembly with shear and gripper jaws of FIG. 8A slightly closed.
Figure 8C:
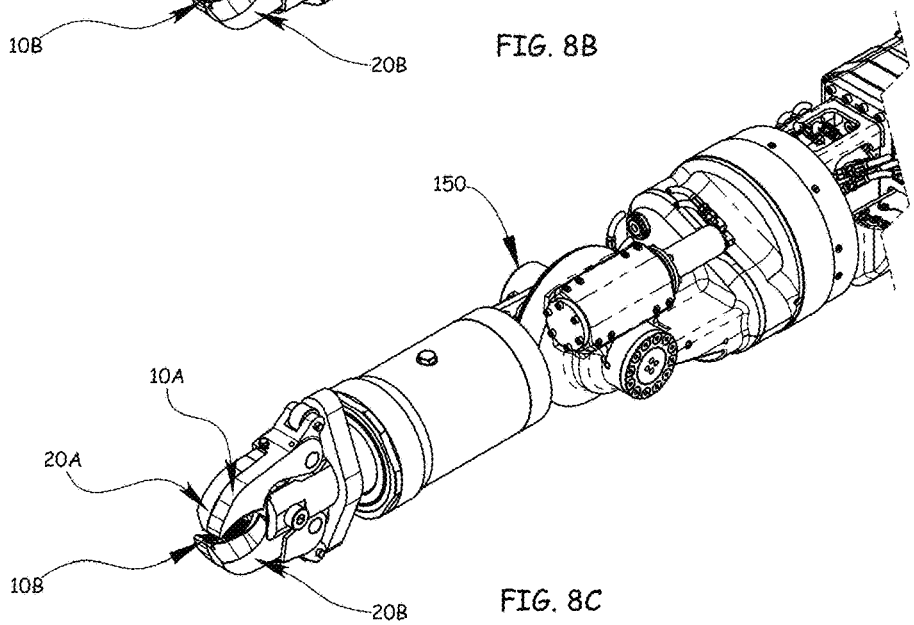
FIG. 8C is a perspective of the arm assembly with shear and gripper jaws of FIG. 8B closed into a full grip position.

FIGS. 8A-8C show perspective views of the arm assembly 150 with shear jaws 20A, 20B and gripper jaws 10A, 10B moving together during the gripping phase.

FIG. 8A is a perspective partial view of the arm assembly with shear jaws 20A, 20B and gripper jaws 10A, 10B fully open.

FIG. 8B is a perspective of the arm assembly 150 with shear jaws 20A, 20B and gripper jaws 10A, 10B of FIG. 8A slightly closed.

FIG. 8C is a perspective of the arm assembly 150 with shear jaws 20A, 20B and gripper jaws 10A, 10B of FIG. 8B closed into a full grip position.

Figure 9A:
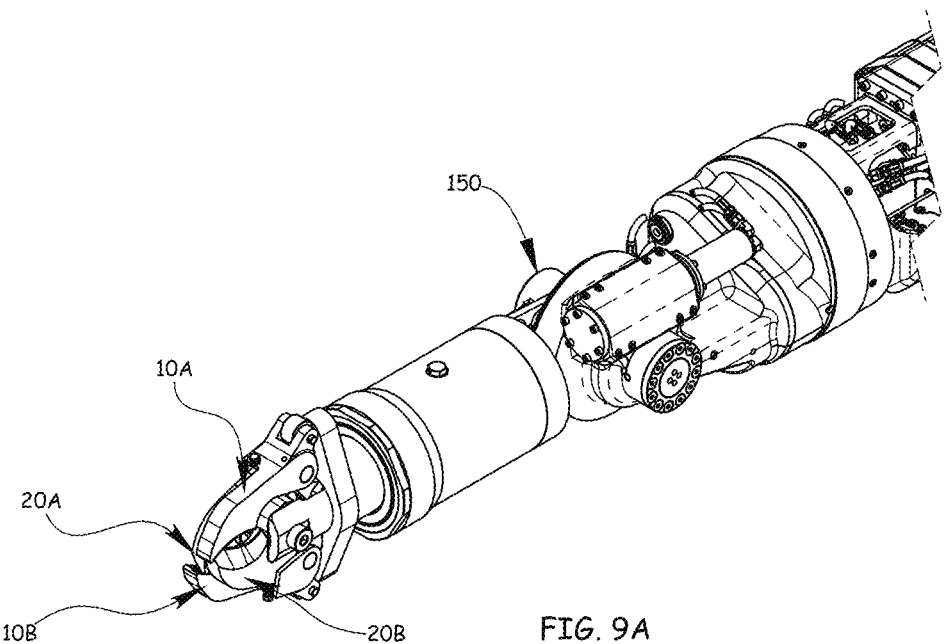
FIGS. 9A-9B is a perspective view of the arm assembly with shear and gripper jaws of FIG. 8C during the shearing phase.

FIG. 9A is a perspective view of the arm assembly 150 with shear jaws 20A, 20B and gripper jaws 10A, 10B of FIG. 8C with shear jaws 20A, 20B in a partial shearing position.

Figure 9B:
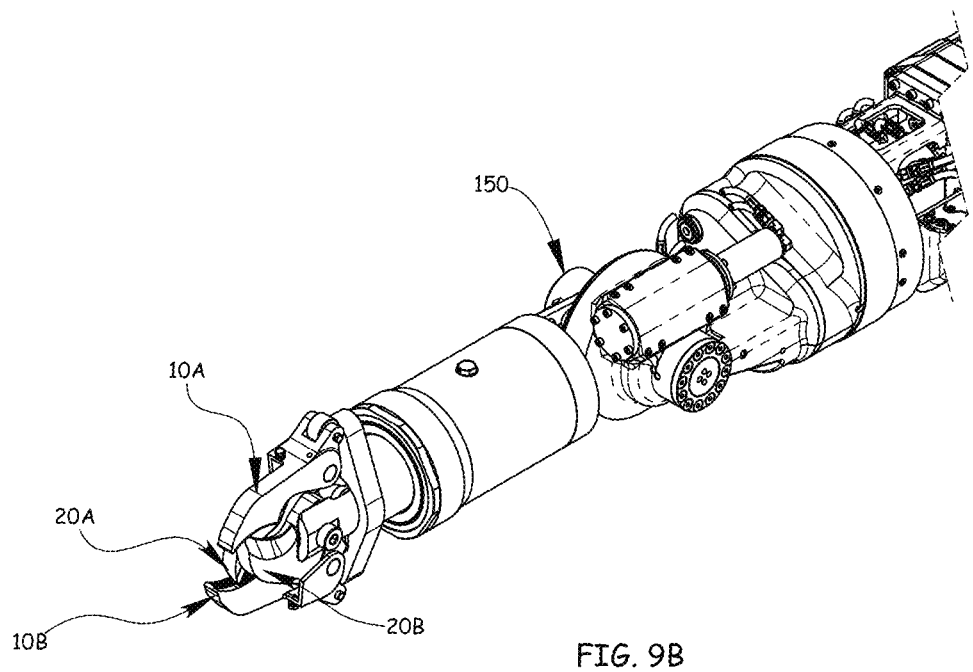

FIG. 9B is a perspective view of the arm assembly 150 with shear jaws 20A, 20B and gripper jaws 10A, 10B of FIG. 9A with shear jaws 20A, 20B in a fully shearing position.

FIGS. 10A-10E are partial views of the arm assembly with shear jaws, 20A, 20B and gripper jaws 10A, 10B of FIGS. 8A-9B, moving from the gripping phase about a pipe/conduit 200 through the shearing phase.

FIG. 10A is another perspective view of FIG. 8A with shear jaws 20A, 20B and gripper jaws 10A, 10B fully open about a pipe/conduit 200.

FIG. 10B is another perspective view of FIG. 8B with shear jaws 20A, 20B and gripper jaws 10A, 10B slightly closed about a pipe/conduit 200.

FIG. 10C is another perspective view of FIG. 8C with shear jaws 20A, 20B and gripper jaws 10A, 10B closed into a full grip about a pipe/conduit 200.

FIG. 10D is another perspective view of FIG. 9A with shear jaws 20A, 20B and gripper jaws 10A, 10B, and shear jaws 20A, 20B in a partial shearing position into the pipe/conduit 200.

FIG. 10E is another perspective view of FIG. 9B with shear jaws, 20A, 20B and gripper jaws 10A, 10B, and shear jaws 20A, 20B n fully shearing position through the pipe/conduit 200.

A prototype of the device 1 was developed with hydraulic pressures up to approximately 15,000 psi (pounds per square inch). Testing showed the grip jaws 10A, 10B able to lift up to an approximately 70 pound object. The shear jaws 20A, 20B were manufactured to increase thicknesses to add more strength, with a stronger, more ductile material with a hardened shear edge to allow the shear jaws 20A, 20B to cut through an approximately 2 inch schedule 80 steel pipe. Further testing showed the shear jaws 20A, 20B cutting through an approximately 3/4 inch diameter stainless steel wire rope.

Figure 11:
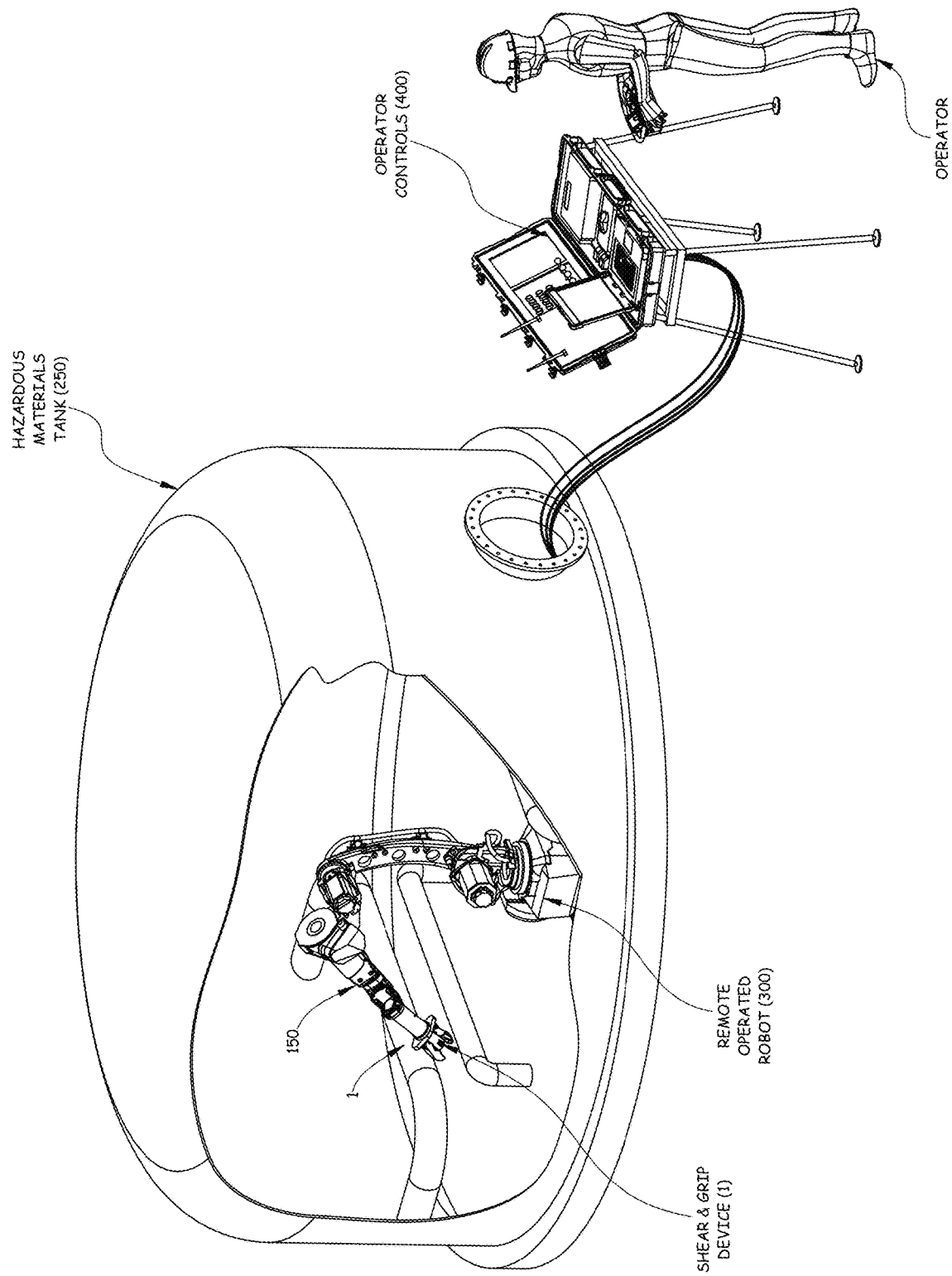
FIG. 11 is a perspective view of the shear and grip device of FIGS. 1A-7 mounted to a remotely operated robot within a hazardous materials tank.

FIG. 11 is a perspective view of the shear and grip device 1 and arm assembly 150 of FIGS. 1A-10E mounted to a remotely operated robot 300 within a hazardous materials tank 250. A remote Operator 400 outside of the hazardous materials tank can operate Operator Controls 400 to control the shear and grip device 1.

Applications for the device 1 can include systems and devices shown and described in U.S. Pat. Nos. 10,280,063; 10,406,571; 10,786, 905; 10,864,640; 11,031,149; 11, 267, 024; 11, 311,920; and 11,413,666 assigned to the same applicant AGI Engineering Inc., as the subject patent application, which are all incorporated by reference in their entirety.

Either or both the shear jaws 20A, 20B and grip jaws 10A, 10B can be directly controlled via hydraulic, pneumatic, electric, spring or other means of opening and closing, or any combination thereof.

Actuator(s) for either or both the shear jaws 20A, 20B and grip jaws 10A, 10B can be selected from at least one of: hydraulic, pneumatic, electric, magnetic, mechanical screw, spring, and any combination thereof, for opening and closing the pair of gripping jaws and the pair of shearing jaws.

The novel shear and grip effector device 1 can be mounted on other devices, machines, and the like, such as but not limited to backhoes, skid-steers, other demolition equipment, and the like.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A shear and grip device, comprising:
   a pair of gripping jaws attached to a grip actuator; and
   a pair of shearing jaws within the pair of gripping jaws attached to a shearing actuator, wherein the grip actuator operates the gripper jaws and the shear actuator operates the shearing jaws in tandem, wherein the grip actuator includes a hydraulic operated pre-load piston that moves both the gripping jaws and the pair of shearing jaws to work together in a grip phase, and wherein the shearing actuator includes a shear hydraulic actuator piston to move the pair of shearing jaws further together in a shear phase, where the hydraulic operated pre-load piston is concentric to the shear hydraulic actuator piston.

2. The shear and grip device of claim 1, further comprising:
   a remote controller for operating the shear and grip device.

3. The shear and grip device of claim 1, further comprising:
   a mount for mounting the shear and grip device to a remotely controlled robot.

4. A shear and grip device, comprising:
   a pair of pivoting gripping jaws attached to a grip actuator; and
   a pair of pivoting shearing jaws adjacent to the pair of pivoting gripping jaws attached to a shear actuator, wherein the grip actuator and the shear actuator causes the gripping jaws and shearing jaws to move together during a gripping phase, and the shear actuator causes the shearing jaws to continue to move together during a shear phase, wherein the grip actuator includes a preload piston for operating the pair of gripping jaws; and the shear actuator includes a shear piston for operator the pair of shear jaws, and wherein the preload piston is oriented concentric to the shear piston.

5. The shear and grip device of claim 4, wherein the preload piston includes a hydraulic preload piston, and the shear piston includes a hydraulic piston.

6. A method for gripping and shearing an object, comprising the steps of:
   providing a pair of pivoting gripping jaws attached to a grip actuator;

providing a pair of pivoting shearing jaws adjacent to the pair of pivoting gripping jaws attached to a shear actuator;

mounting the grip actuator and the shearing actuator to an arm assembly;

providing the grip actuator with a preload piston for operating the pair of gripping jaws; and providing the shear actuator with a shear piston for operator the pair of shear jaws, wherein the preload piston is oriented concentric to the shear piston;

actuating the gripping jaws and the shearing jaws to move together during a gripping phase; and actuating the shearing jaws to continue to move together during a shear phase.

7. The method of claim 6, wherein the preload piston includes a hydraulic preload piston, and the shear piston includes a hydraulic piston.

8. The method of claim 6, further comprising the steps of:

mounting the arm to a support; and remotely controlling the grip actuator and the shear actuator.

9. The method of claim 6, further comprising the step of:

gripping and shearing through pipes and conduits.

\* \* \* \* \*